(12) United States Patent
Nomura

(10) Patent No.: US 6,201,815 B1
(45) Date of Patent: Mar. 13, 2001

(54) TRANSPORT PACKET STREAM SEPARATING CIRCUIT IN WHICH PACKET CAN BE DISCARDED ON ERROR

(75) Inventor: Mamoru Nomura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/084,980

(22) Filed: May 28, 1998

(30) Foreign Application Priority Data

Jun. 9, 1997 (JP) .................................................. 9-150801

(51) Int. Cl.[7] .................................................. H04L 12/54
(52) U.S. Cl. .................................................. 370/429; 370/474
(58) Field of Search .................................. 370/389, 392, 370/393, 395, 398, 399, 409, 410, 412, 413, 415, 417, 422, 426, 428, 429, 470, 471, 473, 474, 485, 486; 714/819, 820, 821

(56) References Cited

U.S. PATENT DOCUMENTS

| | | | |
|---|---|---|---|
| 4,168,469 | * | 9/1979 | Parikh et al. . |
| 5,025,458 | * | 6/1991 | Casper et al. .......................... 375/365 |
| 5,124,977 | * | 6/1992 | Kozaki et al. .......................... 370/392 |
| 5,126,999 | * | 6/1992 | Munter et al. .......................... 370/415 |
| 5,251,203 | * | 10/1993 | Thompson .......................... 370/407 |
| 5,517,250 | | 5/1996 | Hoogenboom et al. . |
| 5,598,415 | | 1/1997 | Nuber et al. . |
| 5,602,920 | * | 2/1997 | Bestler et al. .......................... 380/49 |
| 5,619,501 | * | 4/1997 | Tamer et al. .......................... 370/392 |
| 5,742,623 | | 4/1998 | Nuber et al. . |
| 5,802,063 | * | 9/1998 | Deiss .......................... 370/476 |

* cited by examiner

Primary Examiner—Wellington Chin
Assistant Examiner—Kwang B. Yao
(74) Attorney, Agent, or Firm—McGuireWoods LLP

(57) ABSTRACT

In a transport packet stream separating apparatus, a packet identification filter extracts transport packets having a predetermined packet identification from a stream of transport packets. Each of the extracted transport packets includes at least one section. A section filter unit determines whether a header portion of each of the extracted transport packets is coincident with a reference data, and receives the section of each of the extracted transport packets to output regardless of coincidence or discrepancy between the header portion of each of the extracted transport packets and the reference data. Also, the section filter unit generates a reset signal when it is determined that the header portion of each of the extracted transport packets is not coincident with the reference data. An interface unit receives the section data from the section filter unit, and stores the received section in a storage unit while updating a write address from a start address. Also, the interface unit resets the write address to the start address in response to the reset signal.

11 Claims, 8 Drawing Sheets

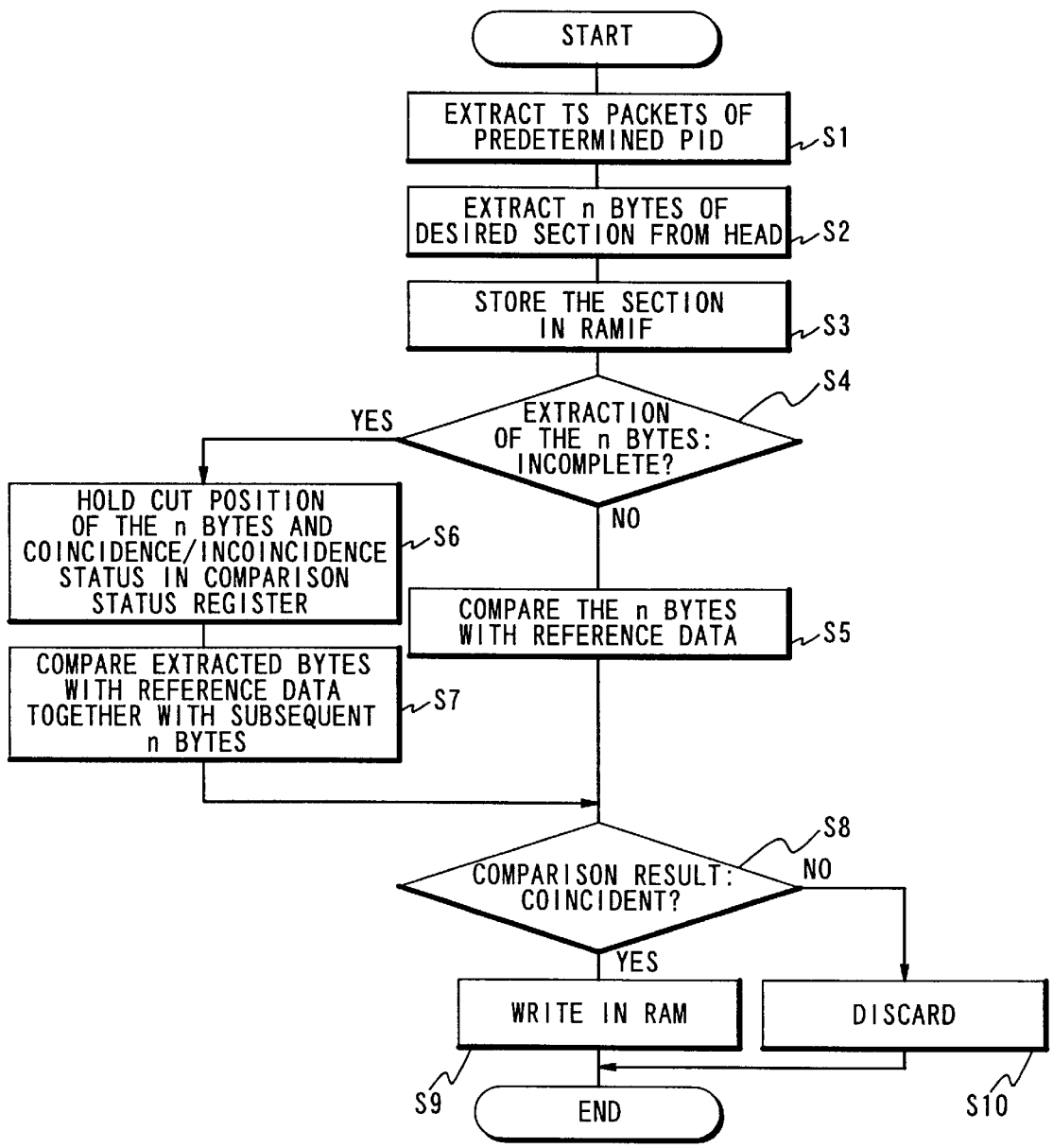

TRANSPORT PACKET STREAM SEPARATING CIRCUIT IN WHICH PACKET CAN BE DISCARDED ON ERROR

BACKGROUND OF THE INVENTION

1. Field of the Invention

The present invention relates to a data separating circuit, and more particularly to a data separating method and data separating circuit, in which a desired section of a desired transport packet is cut out from a MPEG2 transport packet stream defined by the motion picture coding expert group (MPEG2) of the International Standardization Organization (ISO).

2. Description of the Related Art

In an MPEG2 transport packet (TS) stream, a method of transmitting program specific information (hereinafter, to be referred to as PSI) is described in ISO/IEC 13818.1. Here, the method will be described here in brief.

As shown in FIG. 3A, transport packets which have different packet identifiers (PIDs) are multiplexed with respect to time to produce a transport packet stream. Each of the transport packets has the fixed data length of 188 bytes. When the program specific information (PSI) is transmitted in the transport packet stream, the program specific information is divided into sections and is inserted in a transport packet payload section in a transport packet, as shown in FIGS. 3B and 3C. The section is a data packet with an optional length of 4094 bytes in maximum. However, the sections are not always arranged in units of payload sections in the transport packet. There is a case that a plurality of sections exists in the transport packet payload section. The transport packet input rate is generally very high.

The transport packet separating circuit extracts a desired transport packet, specifically only a desired section data which is contained in the extracted transport packet to reduce the capacity of a memory provided of the subsequent stage.

In the method of extracting, only the transport packet is extracted which has the same packet identifier (PID) of 13 bits as a reference packet identifier in the header section. Then, the leading n bytes of the section of the extracted transport packet is compared with a reference data of n bytes by use of a mask data of n bytes. When both are coincident with each other, the section is transferred to the memory of the subsequent stage.

The structure of a conventional MPEG2 transport packet stream separating circuit is shown in FIG. 1. The conventional MPEG2 transport packet stream separating circuit is composed of a packet identifier (PID) filter 1, a section filter unit 22, and a RAM interface (RAMIF) unit 32. The packet identifier filter 1 compares a packet identifier of the transport packet with a reference packet identifier and extracts only the transport packet which has the same packet identifier as the reference packet identifier. The section filter unit 22 detects coincidence or discrepancy between the leading n bytes of the extracted section and a reference data of n bytes by use of a mask data of n bytes. The RAMIF unit 32 generates a write address to the following stage of RAM and a writing signal to the RAM.

The section filter unit 22 is composed of a section start detecting unit 4 for detecting the head portion of the section, a comparator 5, a reference register 6, a mask register 7 and a stack buffer 18. Also, the RAMIF section 32 is composed of a RAMIF signal generating unit 8, a data latch 9, and an address generating unit 19. Also, as show in FIG. 2, the address generating unit 19 is composed of an address register 20 and an incrementer 15.

Next, an operation of this transport packet separating circuit will be described.

The packet identifier filter extracts only transport packet, which has a specific packet identifier, from an inputted transport packet stream, and outputs to the section filter unit 22 of the subsequent stage with the packet identifier. The section start detecting unit 4 of the section filter unit 22 detects the head of the sections of the extracted transport packet, and notifies to the comparator 5 of the subsequent stage by use of a start signal. The comparator 5 compares the leading n bytes of the extracted section and the reference data stored in the reference register 6, and outputs only an coincident portion to the RAMIF section 3 of the subsequent stage. In this case, the n byte data can be masked by use of the mask data stored in the mask register 7 in units of bits.

The RAMIF section 3 of the subsequent stage has the function to write the extracted transport packet in s specific area of the following stage of RAM. The address generating unit 19 is provided for every PID and has an address register 20 which stores the next address to an address where data is last written. The address generating unit 19 selects the address register 20 based on the packet identifier of the transport packet which has been extracted by the section filter unit 2 of the front stage. Also, the RAMIF section 32 writes the data latched by the data latch in the RAM area which is indicated with the address which is incremented by the incrementer 15 each time byte data arrives. In this case, the write signal which is generated by the RAMIF signal generating unit 8 is outputted and the incremented address is set in the address register 20.

As show in FIG. 4, there is a case where the n bytes of the header portion of the section as a comparison object are not contained in a single transport packet (TS packet #2). In other words, the n bytes extend over the transport packet (TS packet #0) and the transport packet (TS packet #2) which have the same packet identifier, because of division of the n bytes at a middle point. In this case, since the section filter unit 2 can not determine coincidence or discrepancy between the n bytes and the reference data, the n bytes are not possible to be outputted to the subsequent stage of RAMIF unit 32. Therefore, the data which is coincident with the reference data to the middle point is necessary to be stored until the subsequent transport packet having the same packet identifier arrives. Thus, the conventional section filter unit 2 needs to be provided with the stack buffer 18 of n bytes for every packet identifier. For example, when 32 kinds of section filter is present and the filtering of 8-byte length is performed in each of the 32 kinds of section filter, the buffer for 256 bytes (=32*8) is required to be provided in the section filter unit 2.

However, in the conventional transport packet stream separating circuit, there is the following problem. That is, it is necessary for the conventional section filter unit 22 to be provided with the stack buffer of n bytes for every PID, when n bytes of the header portion of the section as the comparison object are not contained In a single transport packet but extend over the transport packets which have the same packet identifier.

The reason is that the section filter unit 22 can not output the section as the comparative object to the subsequent stage as in the above case, until coincidence or discrepancy is determined. As a result, the data which is subjected to the coincidence determination to the middle point need to be stored in the section filter unit 22 until the subsequent transport packet arrives.

SUMMARY OF THE INVENTION

The present invention is accomplished in view of the above problems. Therefore, an object of the present invention is to provide an MPEG2 transport packet stream separating circuit, in which a stack buffer which is necessary in a section filter unit of the conventional MPEG2 transport packet stream separating circuit can be removed.

In order to achieve an aspect of the present invention, a transport packet stream separating apparatus includes a storage unit for storing a data, a packet identification filter for extracting transport packets having a predetermined packet identification from a stream of transport packets, each of the extracted transport packets including at least one section, a section filter unit for determining whether a header portion of each of the extracted transport packets is coincident with a reference data, for receiving the section of each of the extracted transport packets to output regardless of coincidence or discrepancy between the header portion of each of the extracted transport packets and the reference data, and for generating a reset signal when it is determined that the header portion of each of the extracted transport packets is not coincident with the reference data, and an interface unit for receiving the section data from the section filter unit, for storing the received section in the storage unit while updating a write address from a start address, and for resetting the write address to the start address in response to the reset signal.

When first and second halves of the header portion are respectively contained in one transport packet and a next transport packet of the extracted transport packets, the section filter unit performs the determination of the coincidence or the discrepancy between the header portion and the reference data by comparing the first half contained in the one transport packet and a corresponding portion of the reference data, and then by comparing the second half contained in the next transport packet and a remaining portion of the reference data without holding the first half. In this case, the section filter unit holds a byte position of a last byte of the first half and a determination result of the first half without holding the first half itself.

Also, the section filter unit may include a section start detecting unit for receiving each of the extracted transport packets and the packet identification to generate a start signal and to output the section and the packet identification, a reference register for storing the reference data, a comparing unit for receiving each of the extracted transport packets, the packet identification and the start signal to output the section and packet identification of each of the extracted transport packets in response to the start signal, for comparing the header portion of each of the extracted transport packets and the reference data, and for generating the reset signal when it is determined that the header portion is not coincident with the reference data, and a comparison resultant register for storing the comparing result by the comparing unit when the header portion extends over two of the extracted transport packets.

Alternatively, the section filter unit may include a section start detecting unit for receiving each of the extracted transport packets and the packet identification to generate a start signal and to output the section and the packet identification, a reference register for storing the reference data, a comparing unit for receiving each of the extracted transport packets, the packet identification and the start signal to output the section and packet identification of the packet identification in response to the start signal, for comparing the header portion and the reference data, and for generating a discrepancy signal when it is determined that the header portion is not coincident with the reference data, a comparison resultant register for storing the comparing result by the comparing unit when the header portion extends over two of the extracted transport packets, an error detecting unit for detecting an error from each of the extracted transport packets, the start signal and the packet identification to generate an error signal, and a logical summing unit for receiving the discrepancy signal and the error signal to generate the reset signal.

The interface unit may include a signal generating unit for generating a write control signal in response to reception of each of parts of the section, a data latching unit for latching each of parts of the section such that the section is written in the storage unit, and an address generating unit for generating the write address in response to the packet identification and the start signal while updating the write address from the start address, and for resetting the write address to the start address in response to the reset signal. In this case, the address generating unit may includes a start address register for holding the start address based on the packet identification, an address offset register for holding an address offset based on the packet identification and for resetting the address offset to zero in response to the reset signal, an address adding unit for adding the start address and the address offset to generate the write signal, and an incrementing unit for incrementing the address offset by a predetermined value to write into the address offset register.

In order to achieve another aspect of the present invention, a method of separating a transport packet stream, includes the steps of:

extracting transport packets having a predetermined packet identification from a stream of transport packets, each of the extracted transport packets including at least one section;

storing the section in a storage unit while updating a write address from a start address;

determining whether a header portion of each of the extracted transport packets is coincident with a reference data;

generating a reset signal when it is determined that the header portion of each of the extracted transport packets is not coincident with the reference data; and discarding the section stored in the storage unit when it is determined that the header portion of each of the extracted transport packets is not coincident with the reference data.

BRIEF DESCRIPTION OF THE DRAWINGS

FIG. 8 is a flow chart illustrating the operation of the transport packet stream separating circuit according to the first embodiment of the present invention.

DESCRIPTION OF THE PREFERRED EMBODIMENTS

Next, the MPEG2 transport packet stream separating circuit of the present invention will be describes with refers to the attached drawings.

Figure 1:
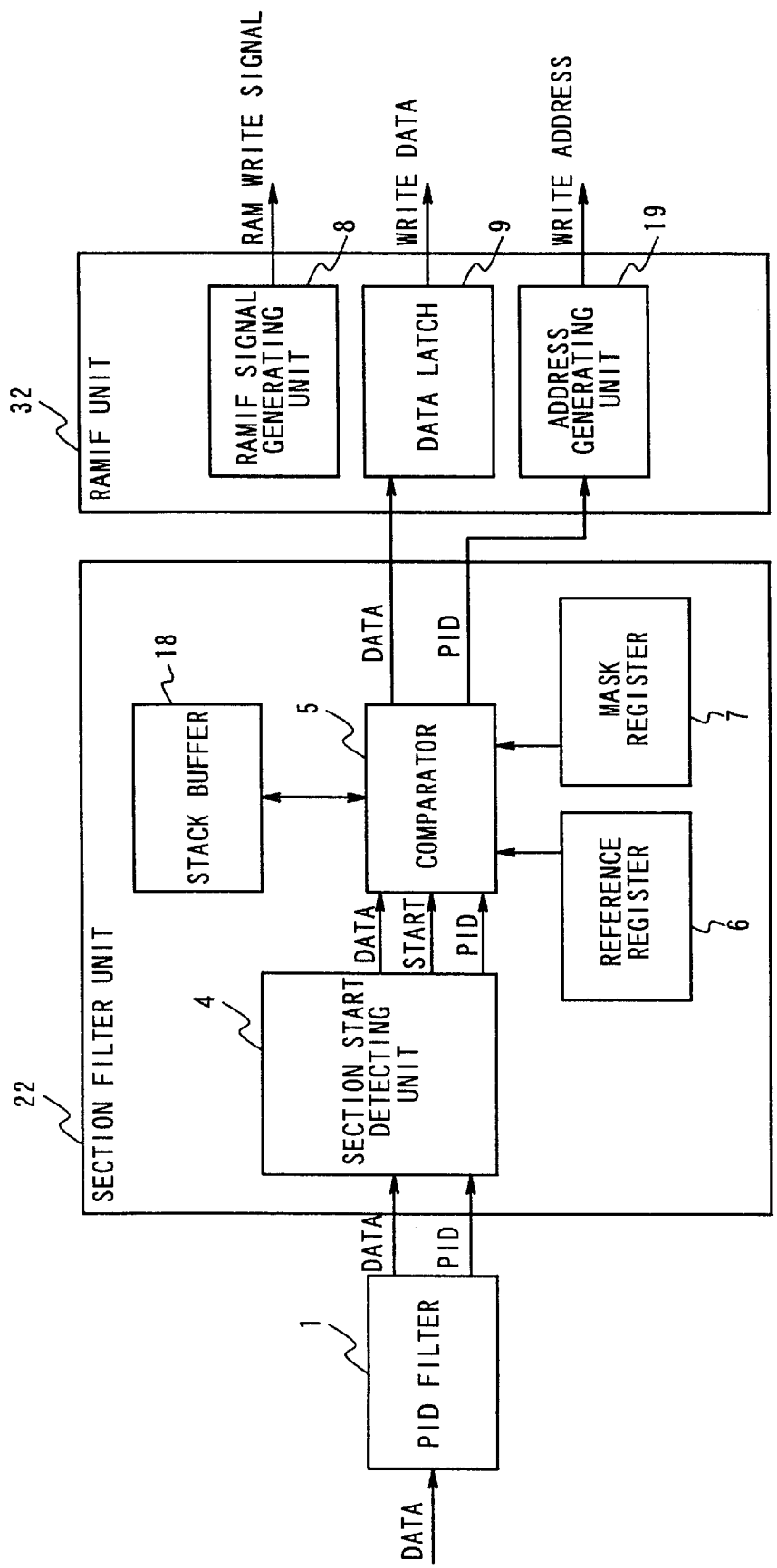
FIG. 1 is a block diagram illustrating the structure of a conventional transport packet stream separating circuit.
Figure 2:
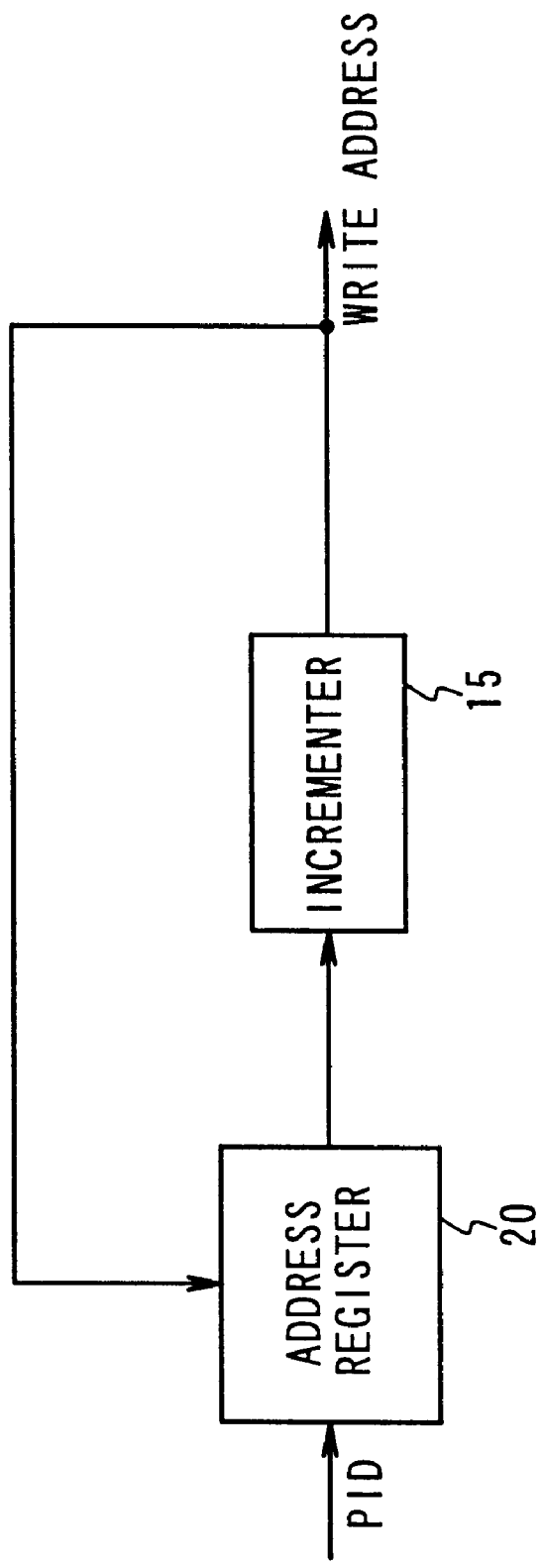
FIG. 2 is a diagram illustrating the structure of the address generating unit 19 shown in FIG. 1.
Figures 3A, 3B, 3C:
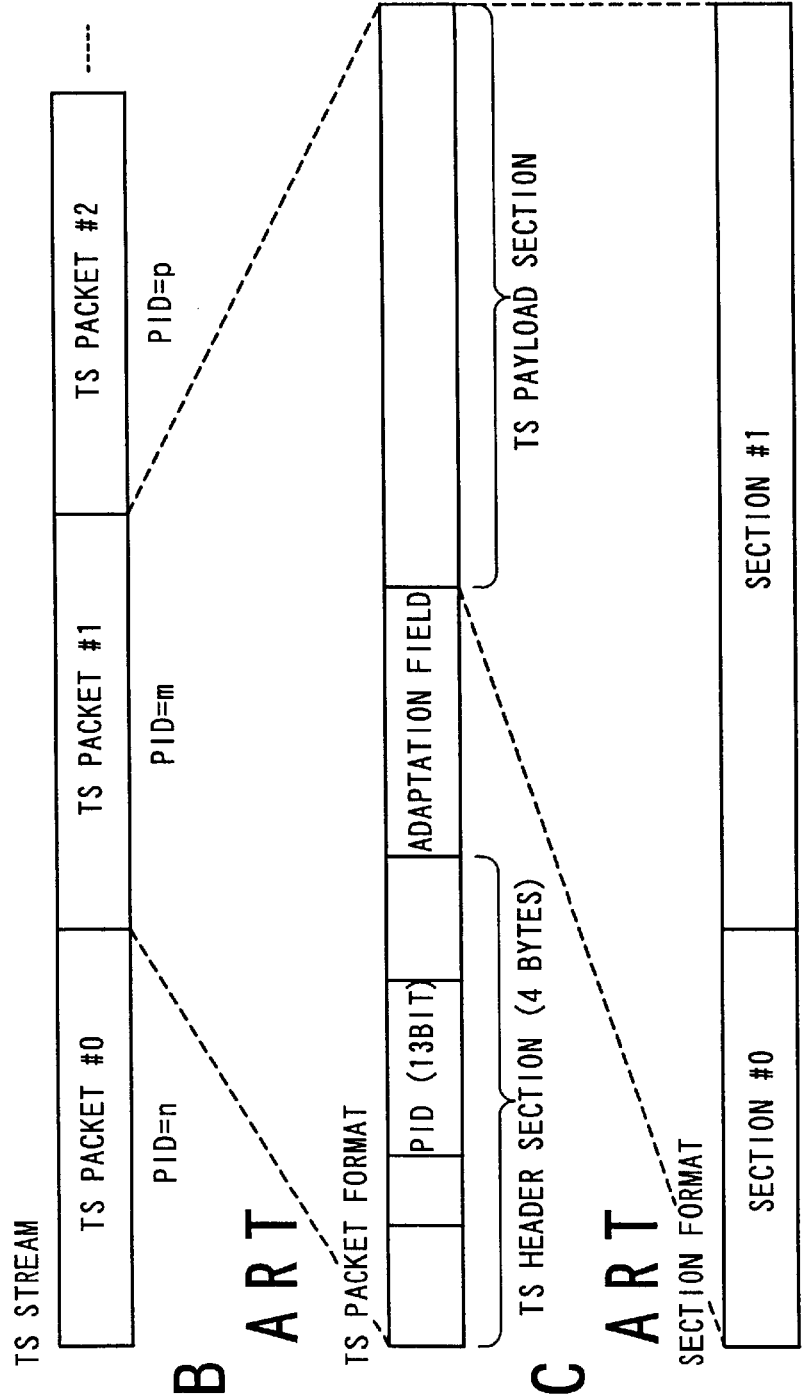
FIGS. 3A to 3C are diagrams illustrating the structure of the transport packet.
Figure 4:
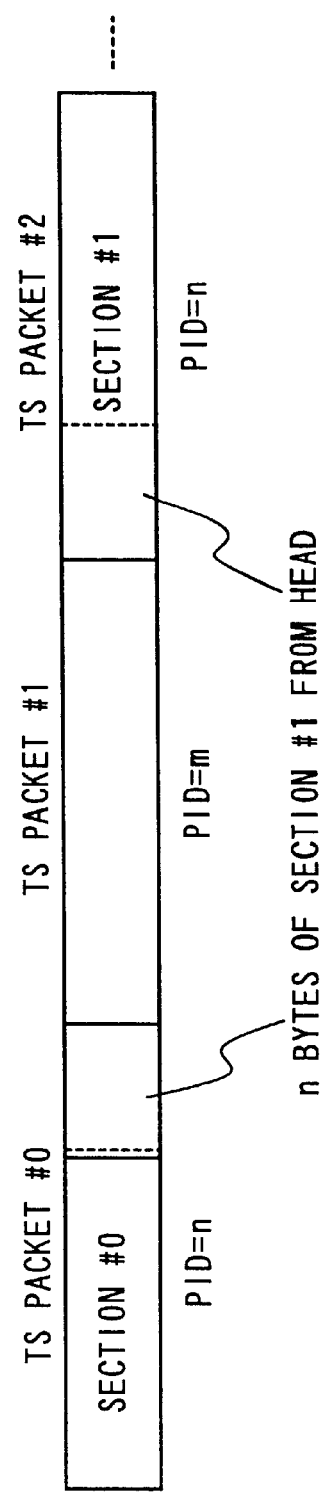
FIG. 4 is a diagram illustrating a case where all the n bytes of the section start are not contained in a single transport packet, but extend over the two transport packets having the same packet identifier.
Figure 5:
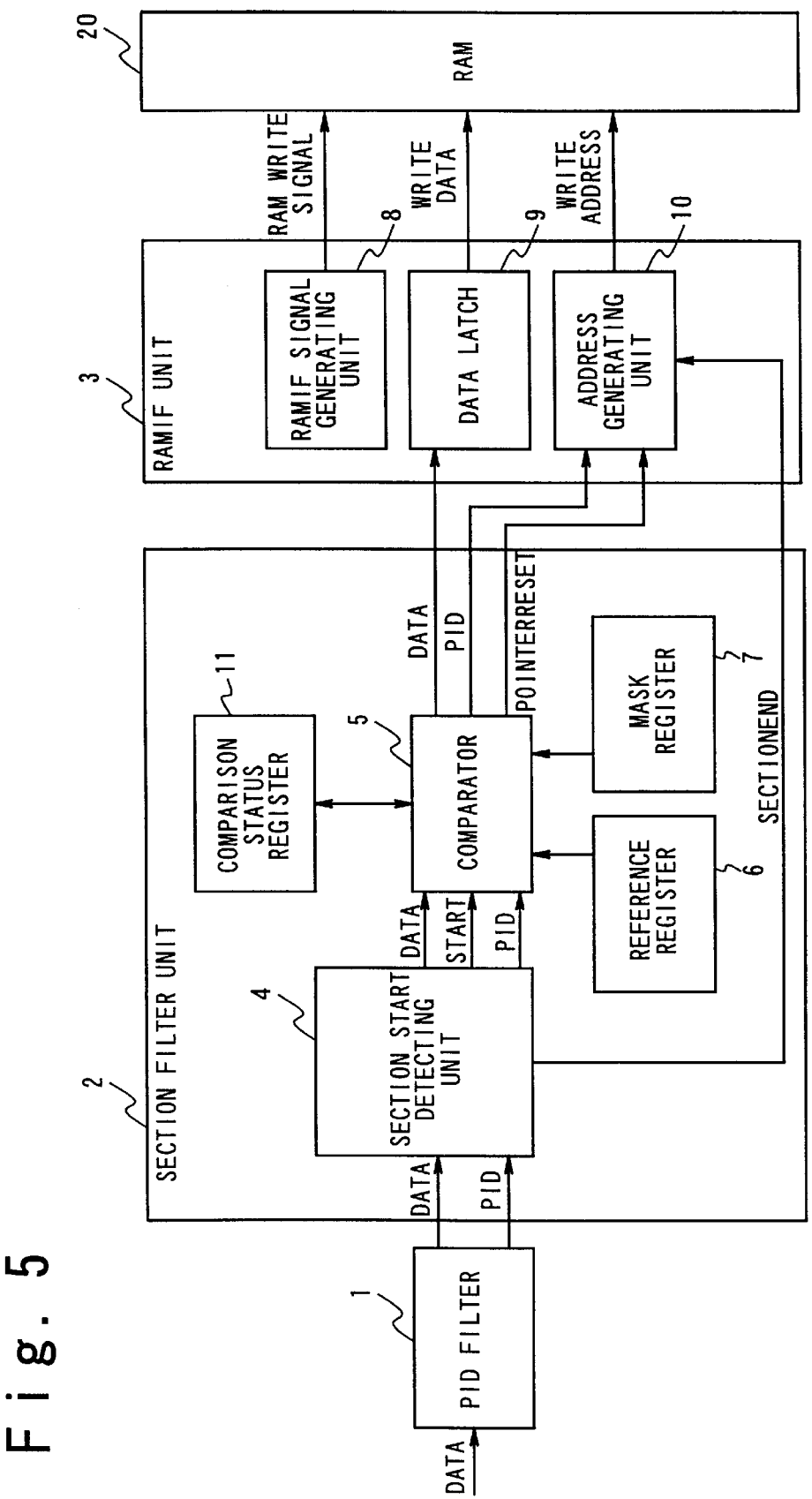
FIG. 5 is a block diagram illustrating the structure of a transport packet stream separating circuit according to a first embodiment of the present invention.

FIG. 5 is a block diagram illustrating the structure of the MPEG2 transport packet stream separating circuit according to the first embodiment of the present invention. Referring to FIG. 5, the transport packet separating circuit is composed of a packet identifier (PID) filter 1, a section filter unit 2, a RAM interface (RAMIF) unit 3 and a RAM 20.

The packet identifier filter 1 compares a packet identifier of each of the transport packets of the stream and a reference packet identifier to extract only the transport packets which have the same packet identifier as the reference packet identifier, for outputting the data and the packet identifier. The section filter unit 2 performs coincidence or discrepancy determination of n bytes of the section start and n bytes of a reference data by use of n bytes of a mask data, based on the data and the packet identifier. Also, the section filter unit 2 outputs a data of the section, the packet identifier, and control signals SECTIONED and POINTERRESET as the result of coincidence determination. The RAMIF section 3 generates a write address and a write signal to the RAM 20 of the subsequent stage, based on the control signals SECTIONED and POINTERRESET, and writes the data in the RAM 20 based on the write address and the write signal.

The section filter unit 2 is composed of a section start detecting unit 4, a comparator 5, a reference register 6, a mask register 7 and a comparison status register 11.

The section start detecting unit 4 detects the section start from the data and the packet identifier from the packet identifier filter 1 to generate a signal START. Also, the section start detecting unit 4 detects the section end to generate THE signal SECTIONED.

The reference register 6 and the mask register 7 store the reference data of n bytes and the mask data of n bytes, respectively. The comparator 5 reads the reference data and the mask data and compares the leading n bytes of the section data supplied from the section start detecting unit 4 with the reference data by use of the mask data in response to the signal START. As a result, when the leading n bytes of the section data is coincident with the reference data, the comparator 5 outputs the section data and the packet identifier to the RAMIF unit 3. On the other hand, when the leading n bytes of the section data is not coincident with the reference data, the comparator 5 outputs the signal POINTERRESET to the RAMIF unit 3. In the case where the n bytes extend over two transport packets having the same packet identifier, the comparator 5 compares a first part of the n bytes contained in the first transport packet and a corresponding part of the reference data. When both are coincident with each other, the comparator 5 stores the last byte position of the first part of the n bytes of the way and a coincidence or discrepancy status between the first part and the corresponding part of the reference data in the comparison status register 11.

The RAMIF section 3 is composed of a RAMIF signal generating unit 8, a data latch 9 and an address generating unit 10. The RAMIF signal generating unit 8 generates a RAM write signal in response to the supply of the section data and the packet identifier from the section filter unit 2.

The data latch 9 latches and outputs the section data to the RAM 20. The address generating unit 10 generates a write address in response to the packet identifier, the signal POINTERRESET and the signal SECTIONED.

Figure 6:
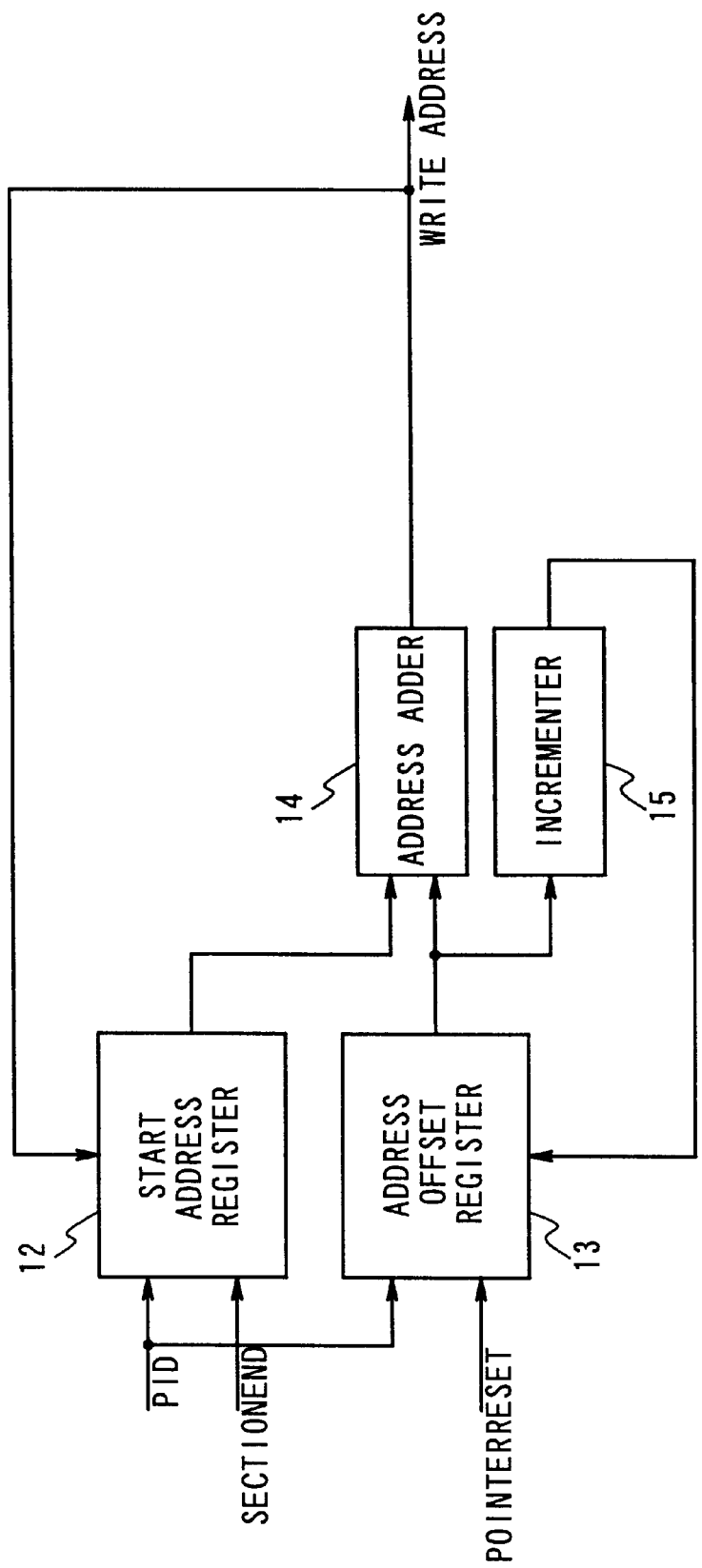
FIG. 6 is a block diagram illustrating the structure of the address generating unit 10 shown in FIG. 5.

As shown in FIG. 6, the address generating unit 10 is composed of the section start address register 12, an address offset register 13, an incrementer 15 and an address adder 14. The section start address register 12 holds a section start address in response to the packet identifier and the signal SECTIONED. The address offset register 13 operates in response to the packet identifier to output an address offset to the address adder 14 and to hold a new address offset which is incremented by the incrementer 15. The address offset held in the address offset register 13 is reset to 0 in response to the signal POINTERRESET. The address adder 14 adds the section start address from the register 12 and the address offset from the register 13 to generate the write address. The write address is supplied to the start address register 12.

Next, the operation of the transport packet stream separating circuit according to the first embodiment of the present invention will be described with reference to FIG. 8 which is a flow chart to describe the operation.

The packet identifier filter unit 1 extracts only the transport packets which have a designated specific packet identifier from among the inputted transport packet stream, and outputs them with the specific packet identifier to the section filter unit 2 of the subsequent stage (Step S1). The section start detecting unit 4 of the section filter unit 2 detects the section start of each of the extracted transport packet based on the packet identifier. Then, the section start detecting unit 4 outputs the section start signal to the comparator 5 of the subsequent stage, together with the data and the packet identifier (Step S2).

The comparator 5 outputs the section data to the RAMIF section 3 of the subsequent stage together with the packet identifier, regardless of coincidence or discrepancy between the n bytes of the section start and the reference data of n bytes (Step 3). The start address register 12 of the address generating unit 10 sets a start address in response to the packet identifier. Also, the address offset register 13 sets an address offset in response to the packet identifier. Each time the section data is supplied from the comparator 5, the RAMIF signal generating unit 8 generates the write signal to output the RAM 20. Also, the data latch 9 latches the section data to output to the RAM 20. Further, the address adder 14 adds the start address from the register 12 and the address offset from the register 13 to output a write address to the RAM 20. In this manner, the section data is sequentially written in the RAM 20. At this time, the address offset is incremented by the incrementer 15 and is held by the address offset register 13 again. Also, when the signal SECTION-END is supplied from the section start detecting unit 4 to the start address register 12, the storing operation is continued.

Also, the comparator 5 determines whether all of the n bytes of the section start are contained or a part of the n bytes is contained (Step 4). When the n byte of the section start are contained, the n byte of the section start is compared with the reference data which is previously registered on the reference data register 6 (Step 5).

On the other hand, when the n bytes of the section start are not contained, a broken byte position and a coincidence or discrepancy status is held in the comparison status register 11 (Step 6). After that, the broken byte position and the coincidence or discrepancy status of the n bytes in the comparison status register 11 are loaded on the comparator 5 when the subsequent transport packet arrives. In this case, a remaining part of the n bytes of section start is compared with a corresponding part of the reference data by use of the broken byte position and the mask data read out from the mask register 7 (Step 7).

When the n bytes of the section start is coincident with the reference data (Step 8), the storing operation of the section data is continued (Step 9).

Also, in case of the discrepancy between the n bytes of the section start and the reference data (Step 8), the signal POINTERRESET is generated by the comparator 5. At this time, data subsequent to the n bytes of the section start is not outputted to the RAMIF section 3 of the subsequent stage. The offset address register 13 of the RAMIF section 3 is reset to 0 in response to the signal POINTERRESET. The write address to the RAM is set as the value of the section start address register 12. Therefore, the next section data is overwritten from the start address held in the start address register. Thus, the already stored data bytes of the section are discarded (Step 10).

In this manner, the stack buffer 18 can be removed which is necessary in the conventional structure, when all of the n bytes of the section start are not contained in a single transport packet, and only a part of the n bytes is contained.

Figure 7:
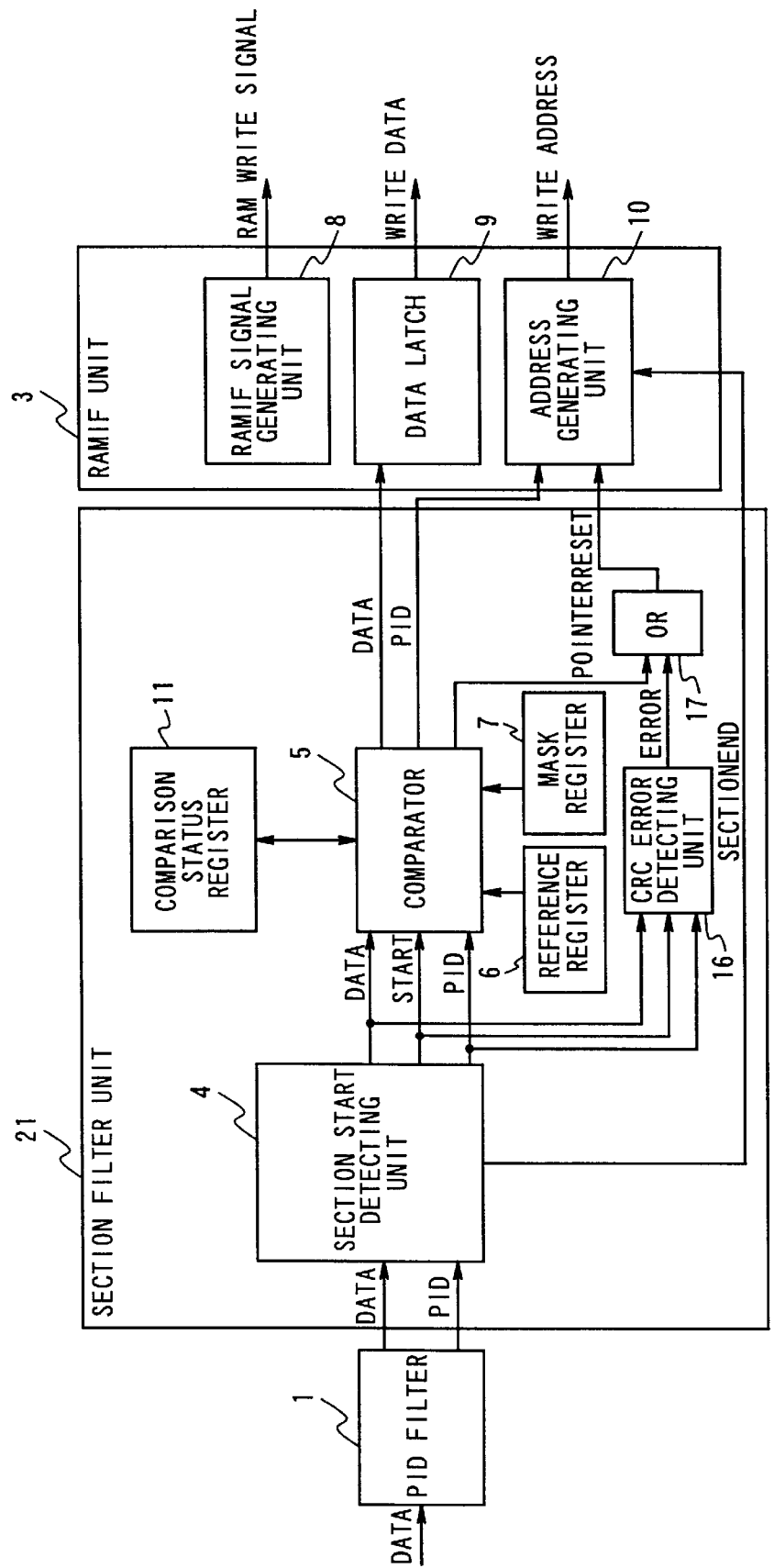
FIG. 7 is a block diagram illustrating the structure of the transport packet stream separating circuit according to a second embodiment of the present invention.

Next, the MPEG2 transport packet stream separating circuit according to the second embodiment of the present invention will be described with reference to FIG. 7. Referring to FIG. 7, there is a difference between the first embodiment and the second embodiment in the section filter unit 21. In the second embodiment, the section filter unit 21 is composed of a CRC error detecting unit 16, and an OR gate 17 in addition to the section start detecting unit 4, the comparator 5, the reference register 6, the mask register 7 and the comparison status register 11. The CRC error detecting unit 16 receives the section data, the start signal and the packet identifier from the section start detecting unit 4 and detects that the section data contains any CRC error to output a signal ERROR which indicates the CRC error. The OR gate 17 performs a logical OR calculation of the signal ERROR and a signal indicating that the n bytes of the section start is not coincident with the reference data to output the calculation result as the signal POINTERRESET to the RAMIF unit 3. The RAMIF section 3 is composed of the RAMIF signal generating unit 8, the data latch 9 and the address generating unit 10, as in the first embodiment. The address generating unit 10 is composed of the section start address register 12, the address offset register 13, the address adder 14 and the incrementer 15, as shown in FIG. 6.

A CRC code is set as the last 4 bytes of the section data. The CRC error detecting unit 16 of the section filter unit 21 detects whether any CRC error is present in the section data. Since the CRC error is detected in the last data of the section, the section data before the last data is already written in the RAM of the subsequent stage, regardless of the existence or nonexistence of the CRC error. Since the signal ERROR from the CRC error detecting unit 16 is made active in case of the error detection, the signal POINTERRESET to the RAMIF section 3 is also made active. The offset address register 13 of the RAMIF section 3 is reset to 0 in response to the signal POINTERRESET, and the write address to the RAM is set as the value of the section start address register 12. For this reason, the already written section data which contains the error can be discarded.

As described above, according to the MPEG2 transport packet stream separating circuit of the present invention, the stack buffer of n bytes necessary for each packet identifier in the conventional section filter unit can be removed.

What is claimed is:

1. A transport packet stream separating apparatus comprising:
   a storage unit for storing a data;
   a packet identification filter for extracting transport packets having a predetermined packet identification from a stream of transport packets, each of said extracted transport packets including at least one section;
   a section filter unit for determining whether a header portion of each of the extracted transport packets is coincident with a reference data, for outputting said at least one section of each of the extracted transport packets regardless of coincidence or discrepancy between said header portion of each of the extracted transport packets and said reference data, and for generating a reset signal when it is determined that said header portion of each of the extracted transport packets is not coincident with said reference data; and
   an interface unit for receiving the at least one section from said section filter unit, for storing the received section in said storage unit while updating a write address from a start address, and for resetting said write address to said start address in response to said reset signal,
   wherein when first and second halves of said header portion are respectively contained in one transport packet and a next transport packet of the extracted transport packets, said section filter unit determines the coincidence or the discrepancy between said header portion and said reference data by comparing said first half contained in said one transport packet and a corresponding portion of said reference data, and then by comparing said second half contained in said next transport packet and a remaining portion of said reference data without holding said first half.

2. A transport packet stream separating apparatus according to claim 1, wherein said section filter unit holds a byte position of a last byte of said first half and a determination result of said first half without holding said first half itself.

3. A transport packet stream separating apparatus comprising:
   a storage unit for storing a data;
   a packet identification filter for extracting transport packets having a predetermined packet identification from a stream of transport packets, each of said extracted transport packets including at least one section;
   a section filter unit for determining whether a header portion of each of the extracted transport packets is coincident with a reference data, for outputting said at least one section of each of the extracted transport packets regardless of coincidence or discrepancy between said header portion of each of the extracted transport packets and said reference data, and for generating a reset signal when it is determined that said header portion of each of the extracted transport packets is not coincident with said reference data; and
   an interface unit for receiving the at least one section from said section filter unit, for storing the received section in said storage unit while updating a write address from a start address, and for resetting said write address to said start address in response to said reset signal,
   wherein said section filter unit comprises:
      a section start detecting unit for receiving each of the extracted transport packets and the packet identification to generate a start signal and to output said at least one section and said packet identification;

a reference register for storing said reference data;

a comparing unit for receiving each of the extracted transport packets, the packet identification and the start signal to output the section and packet identification of each of the extracted transport packets in response to said start signal, for comparing said header portion of each of the extracted transport packets and said reference data, and for generating said reset signal when it is determined that said header portion is not coincident with said reference data; and a comparison resultant register for storing the comparing result by said comparing unit when the header portion extends over two of the extracted transport packets.

4. A transport packet stream separating apparatus comprising:

a storage unit for storing a data;

a packet identification filter for extracting transport packets having a predetermined packet identification from a stream of transport packets, each of said extracted transport packets including at least one section;

a section filter unit for determining whether a header portion of each of the extracted transport packets is coincident with a reference data, for outputting said at least one section of each of the extracted transport packets regardless of coincidence or discrepancy between said header portion of each of the extracted transport packets and said reference data, and for generating a reset signal when it is determined that said header portion of each of the extracted transport packets is not coincident with said reference data; and an interface unit for receiving the at least one section from said section filter unit, for storing the received section in said storage unit while updating a write address from a start address, and for resetting said write address to said start address in response to said reset signal, wherein said section filter unit comprises:

a section start detecting unit for receiving each of the extracted transport packets and the packet identification to generate a start signal and to output said at least one section and said packet identification;

a reference register for storing said reference data;

a comparing unit for receiving each of the extracted transport packets, the packet identification and the start signal to output the at least one section and packet identification of said packet identification in response to said start signal, for comparing said header portion and said reference data, and for generating a discrepancy signal when it is determined that said header portion is not coincident with said reference data;

a comparison resultant register for storing the comparing result by said comparing unit when the header portion extends over two of the extracted transport packets;

an error detecting unit for detecting an error from each of the extracted transport packets, said start signal and said packet identification to generate an error signal; and a logical summing unit for receiving said discrepancy signal and said error signal to generate said reset signal.

5. A transport packet stream separating apparatus comprising:

a storage unit for storing a data;

a packet identification filter for extracting transport packets having a predetermined packet identification from a stream of transport packets, each of said extracted transport packets including at least one section;

a section filter unit for determining whether a header portion of each of the extracted transport packets is coincident with a reference data, for outputting said at least one section of each of the extracted transport packets regardless of coincidence or discrepancy between said header portion of each of the extracted transport packets and said reference data, and for generating a reset signal when it is determined that said header portion of each of the extracted transport packets is not coincident with said reference data; and an interface unit for receiving the at least one section from said section filter unit, for storing the received section in said storage unit while updating a write address from a start address, and for resetting said write address to said start address in response to said reset signal, wherein said interface unit comprises:

a signal generating unit for generating a write control signal in response to reception of each of parts of the section;

a data latching unit for latching each of parts of said section such that said at least on section is written in said storage unit; and an address generating unit for generating said write address in response to said packet identification and a start signal while updating said write address from said start address, and for resetting said write address to said start add). in raponise to said reset signal, wherein said address generating unit comprises:

a start address register for holding said start address based on said packet identification;

an address offset register for holding an address offset based on said packet identification and for resetting said address offset to zero in response to said reset signal;

an address adding unit for adding said start address and said address offset to generate said write signal; and an incrementing unit for incrementing said address offset by a predetermined value to write into said address offset register.

6. A method of separating a transport packet stream, comprising the steps of:

extracting transport packets baying a predetermined packet identification from a stream of transport packets, each of said extracted transport packets including at least one section;

storing the section in a storage unit while updating a write address from a start address;

determining whether a header portion of each of the extracted transport packets is coincident with a reference data;

enerating a reset signal when it is determined that said header portion of each of the extracted transport packets is not coincident with said reference data; and discarding said section stored in said storage unit when it is determined that said header portion of each of the extracted transport packets is not coincident with said reference data, wherein when first and second halves of said header portion are respectively contained in one transport packet and a next transport packet of the extracted transport packets, performing said determining step by comparing said first half contained in said one transport packet and a corresponding portion of said reference data, and then by comparing said second half contained in said next transport packet and a remaining portion of said reference data without holding said first half.

7. A method according to claim 6, wherein said performing step includes holding a byte position of a last byte of said first half and a determination state of said first half without holding said first half itself.

8. A method of separating a transport packet stream, comprising the steps of:
   extracting transport packets having a predetermined packet identification from a stream of transport packets, each of said extracted transport packets including at least one section;
   storing the section in a storage unit while updating a write address from a start address;
   determining whether a header portion of each of the extracted transport packets is coincident with a reference data;
   generating a reset signal when it is determined that said header portion of each of the extracted transport packets is not coincident with said reference data;
   discarding said section stored in said storage unit when it is determined that said header portion of each of the extracted transport packets is not coincident with said reference data;
   comparing said header portion and said reference data using a mask data;
   generating a discrepancy signal when it is determined that said header portion is not coincident with said reference data;
   storing a result of said comparing step;
   detecting an error from each of said transport packets, a start signal and said packet identification to generate an error signal; and
   generating a reset signal from said discrepancy signal and said error signal.

9. A method of separating a transport packet stream, comprising the steps of:
   extracting transport packets having a predetermined packet identification from a stream of transport packets, each of said extracted transport packets including at least one section;
   storing the section in a storage unit while updating a write address from a start address;
   determining whether a header portion of each of the extracted transport packets is coincident with a reference data;
   generating a reset signal when it is determined that said header portion of each of the extracted transport packets is not coincident with said reference data; and
   discarding said section stored in said storage unit when it is determined that said header portion of each of the extracted transport packets is not coincident with said reference data,
   wherein said step of storing the section comprises the steps of:
      generating a write control signal in response to reception of each of parts of the section;
      latching each of the parts of the section such that the section is written in said storage unit;
      generating said write address in response to said packet identification and said start signal while updating said write address from said start address; and
      resetting said write address to said start address in response to said reset signal,
   wherein said step of generating a write address includes:
      holding said start address based on said packet identification;
      holding an address offset based on said packet identification;
      adding said start address and said address offset to generate said write signal;
      incrementing said address offset by a predetermined value to write into an address offset register; and
      resetting said address offset to zero in response to said reset signal.

10. A method of extracting desired data from a packet stream, wherein said packets each comprise a packet identifier (PID) and a payload field comprising data sections, even when a header identifying said desired data is cut and contained in packets, said method comprising the steps of:
   comparing a PID of a packet in said packet stream to a predetermined PID;
   extracting said packet if said PID of said packet matches said predetermined PID;
   extracting header data form a desired data section in said packet;
   determining if said header data represents complete header or a first header portion;
   if said header is a first header portion:
      storing a cut position of said first header portion;
      comparing said first header portion to a corresponding portion of a reference data;
      storing a comparison result;
      discarding said first header portion;
      extracting a second header portion form a subsequent data section and comparing said second header portion to a corresponding portion of said reference data at said cut position;
      if said second header portion matches and said comparison result indicates that said first header portion matched, then storing data section data, else discarding said data section.

11. A method of extracting desired data from a packet stream, as recited in claim 10 wherein said packet stream is a motion picture expert group-2 (MPEG2) format.

* * * * *